United States Patent

Mathis

[11] Patent Number: 6,015,363
[45] Date of Patent: Jan. 18, 2000

[54] AUTOMATIC TRANSMISSION REQUIRING OPERATION OF SINGLE FRICTION DEVICE FOR GEAR SHIFT

[75] Inventor: Roland Mathis, Ribeauville, France

[73] Assignee: Delphi France Automotive Systems, La Garenne-Colombes, France

[21] Appl. No.: 09/192,630

[22] Filed: Nov. 16, 1998

[30] Foreign Application Priority Data

Apr. 24, 1998 [GB] United Kingdom .................. 9808672

[51] Int. Cl.[7] ...................................................... P16H 3/62
[52] U.S. Cl. ........................ 475/281; 475/283; 475/285; 475/287; 475/338
[58] Field of Search .................................... 475/280, 281, 475/282, 283, 284, 285, 286, 287, 338

[56] References Cited

U.S. PATENT DOCUMENTS

| | | | |
|---|---|---|---|
| 3,626,788 | 12/1971 | Smalinskas | 475/287 |
| 4,242,924 | 1/1981 | Melhorn et al. | 475/281 |
| 4,304,153 | 12/1981 | Moroto et al. | 475/281 X |
| 4,916,980 | 4/1990 | Asada et al. | 475/281 |
| 4,938,096 | 7/1990 | Takahashi et al. | 475/287 X |
| 5,495,778 | 3/1996 | Mochizuki | 475/284 X |
| 5,700,223 | 12/1997 | Park et al. | 475/285 X |

FOREIGN PATENT DOCUMENTS 2309756A 8/1997 United Kingdom .
2309757A 8/1997 United Kingdom .

*Primary Examiner*—Charles A. Marmor
*Assistant Examiner*—Ankur Parekh
*Attorney, Agent, or Firm*—Dean L. Ellis; Michael J. Bridges

[57] ABSTRACT

An automatic transmission comprising a housing (12); a planetary gear train (14) mounted within the housing; an input drive shaft (16) for providing input drive to the planetary gear train; an output drive shaft (18) connected with an output drive from the planetary gear train; a first clutch (C1) connected between the input drive shaft and a first drive input (22) to the planetary gear train; a second clutch (C2) connected between a first reaction input (28) to the planetary gear train and the housing; a third clutch (C3) connected between a second reaction input (30) to the planetary gear train and the housing; a fourth clutch (C4) connected between a third reaction input (32) to the planetary gear train and the housing; and a fifth clutch (C5) connected between a second drive input (24) to the planetary gear train and the input drive shaft; wherein for first forward gear ratio the first and second clutches are engaged; for second forward gear ratio the first, second and third clutches are engaged; for third forward gear ratio the first, second, third and fourth clutches are engaged; and for fourth forward gear ratio the first, second, third, fourth and fifth clutches are engaged. Allows gear shift by the operation of a single clutch.

5 Claims, 2 Drawing Sheets

Fig.3.

| | C1 | C2 | C3 | C4 | C5 | C6 | C7 | C8 | C9 | F1 | F2 | F3 | F4 | RATIO |
|---|---|---|---|---|---|---|---|---|---|---|---|---|---|---|
| 1st | X | X | | | | | X | | | X | X | | | $d1/a2$ |
| 2nd | X | X | X | | | | X | | | X | | X | | $\dfrac{d1(a2+d2)}{a2(d1+d2)}$ |
| 3rd | X | X | X | X | | | X | | | X | | | X | $\dfrac{1+a1/a2}{1+a1/d1}$ |
| 4th | X | X | X | X | X | | X | | | X | | | | 1 |
| 5th | X | X | X | X | X | X | | | | | | | | $\dfrac{d1}{d1+a1}$ |
| REV | | | | | | | | X | X | | | | | $-d1/a1$ |

AUTOMATIC TRANSMISSION REQUIRING OPERATION OF SINGLE FRICTION DEVICE FOR GEAR SHIFT

TECHNICAL FIELD

The present invention relates to an automatic transmission having four or more forward speed ratios.

BACKGROUND OF THE INVENTION

Automatic transmissions are known in which the operation of a planetary gear train is controlled to provide the desired output gear ratio. In these known arrangements, a number of friction devices, that is, clutches and brakes, are engaged and disengaged to control the relative rotation of the gears of the planetary gear train to provide the required gear ratio. A problem with known arrangements is the necessity to control the timing of the disengagement of a clutch or brake whilst substantially simultaneously engaging another clutch or brake to provide a change from one gear ratio to another gear ratio.

SUMMARY OF THE INVENTION

It is an object of the present invention to overcome this problem.

An automatic transmission in accordance with the present invention comprises a housing; a planetary gear train mounted within the housing; an input drive shaft for providing input drive to the planetary gear train; an output drive shaft connected with an output drive from the planetary gear train; a first clutch connected between the input drive shaft and a first drive input to the planetary gear train; a second clutch connected between a first reaction input to the planetary gear train and the housing; a third clutch connected between a second reaction input to the planetary gear train and the housing; a fourth clutch connected between a third reaction input to the planetary gear train and the housing; and a fifth clutch connected between a second drive input to the planetary gear train and the input drive shaft; wherein for first forward gear ratio the first and second clutches are engaged; for second forward gear ratio the first, second and third clutches are engaged; for third forward gear ratio the first, second, third and fourth clutches are engaged; and for fourth forward gear ratio the first, second, third, fourth and fifth clutches are engaged.

In the present invention, therefore, a gear change or shift between adjacent forward ratios is achieved by the engagement or disengagement of a single clutch, thereby eliminating the need for a timed engagement and disengagement of two or more friction elements.

BRIEF DESCRIPTION OF THE DRAWINGS

The present invention will now be described, by way of example, with reference to the accompanying drawings, in which:

FIG. 3 is a table of gear ratio and clutch engagement for the automatic transmission of FIG. 1.

DESCRIPTION OF THE PREFERRED EMBODIMENT

Figure 1:
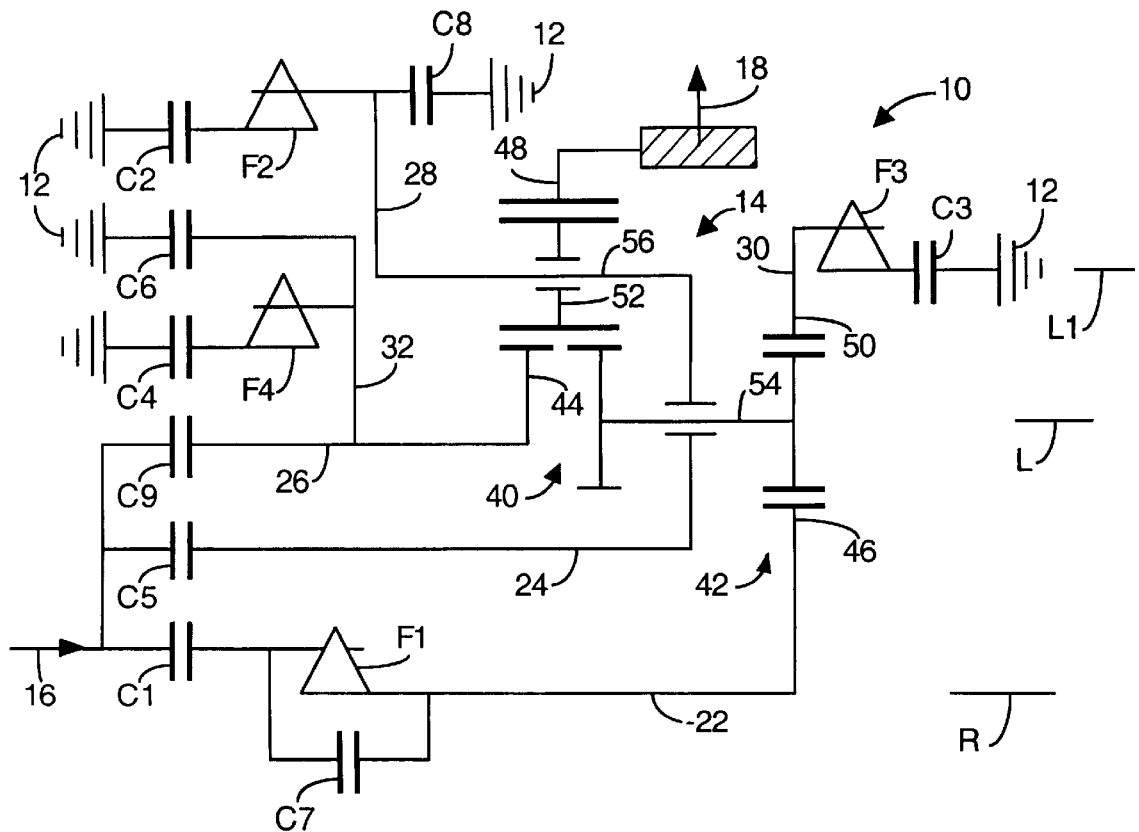
FIG. 1 is a schematic diagram of an automatic transmission in accordance with the present invention.
Figure 2:
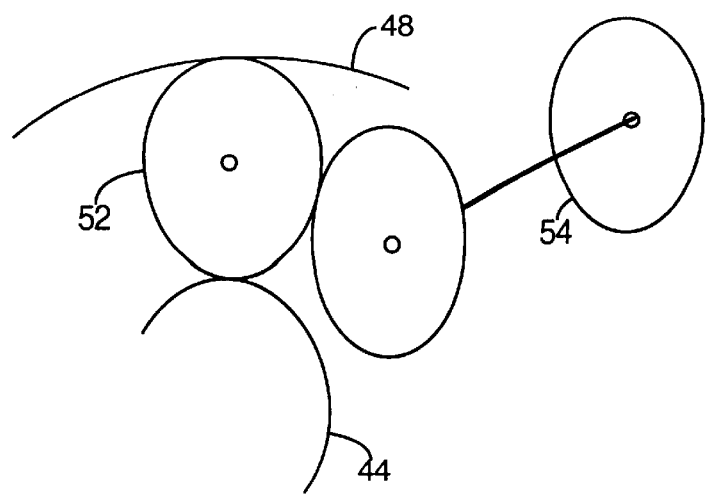
FIG. 2 is a schematic side view of the first planetary gear set of the planetary gear train of the automatic transmission of FIG. 1.

Referring to FIG. 1, an automatic transmission 10 in accordance with the present invention is shown. The transmission 10 is capable of providing five forward speed ratios and one reverse speed ratio. The automatic transmission 10 comprises a housing 12, a planetary gear train 14, an input drive shaft 16 and an output drive shaft 18. The input drive shaft 16 is connectable with the output drive shaft of an engine or other powered driving means (not shown), preferably by way of a torque converter (not shown), in any suitable manner known to those skilled in the art. The output drive shaft 18 is connected to the driven wheels (not shown) of a motor vehicle or other rotatably driven means in any suitable manner known to those skilled in the art. The planetary gear train 14 comprises a pair of planetary gear sets 40,42 each comprising a sun gear 44,46, respectively, and a ring gear 48,50, respectively. The first planetary gear set 40 further comprises first and second pinion gears 52,54, respectively. The pinion gear 52 is a short pinion which engages the sun gear 44 and the ring gear 48, and which is rotatably mounted on a planet carrier 56. The pinion gear 54 is a long pinion which engages the pinion gear 52, and which is rotatably mounted on the planet carrier 56. The layout of the sun gear 44, ring gear 48, and pinion gears 52,54 can be seen in FIG. 2. The second planetary gear set 42 further comprises the long pinion gear 54. The pinion gear 54 engages the ring gear 50 and the sun gear 46. The sun gears 44,46 and the ring gears 48,50 have a common center line R (axis of rotation) which is substantially parallel to the center lines L1, L (rotational axes) of the pinion gears 52,54. The rotational axes L1, L are fixed relative to one another. The pinion gears 52,54 are preferably rotatably mounted by way of low friction devices such as bearings, bushes, etc. The ring gear 48 of the first planetary gear set 40 drives the output drive shaft 18.

Additional identical sets of pinion gears 52,54 may be positioned between the sun gears 44,46 and the ring gears 48,50. Alternatively, where there are two or more long pinion gears 54, a reduced number of short pinion gears 52 may be used. Additionally, where there are two or more long pinion gears 54, the long pinion gears may be equally spaced or non-equally spaced around the circumference of the sun gear 46. Further, where there are two or more long pinion gears 54 and an even number of short pinion gears 52, the number of long pinion gears may be half the number of short pinion gears, with the long pinion gears engaging alternate short pinion gears.

The planetary gear train 14 has first, second and third drive inputs 22,24,26, respectively, connectable with the input drive shaft 16. The planetary gear train 14 also has first, second, and third reaction inputs 28,30,32, respectively, connectable with the housing 12. The first drive input 22 is connected with the sun gear 46 of the second planetary gear set 42. The second drive input 24 is connected with the planet carrier 56. The third drive input 26 is connected with the sun gear 44 of the first planetary gear set 40. The first reaction input 28 is connected with the planet carrier 56. The second reaction input 30 is connected with the ring gear 50 of the second planetary gear set 42. The third reaction input 32 is connected with the sun gear 44 of the first planetary gear set 40.

The first drive input 22 is connectable with the input drive shaft 16 by way of a first clutch C1 and a first free wheel or one-way coupling F1. The first reaction input 28 is connectable with the housing 12 by way of a second clutch C2 and a second free wheel or one-way coupling F2. The second reaction input 30 is connectable with the housing 12 by way of a third clutch C3 and a third free wheel or one-way coupling F3. The third reaction input 32 is connectable with the housing 12 by way of a fourth clutch C4 and a fourth free wheel or one-way coupling F4. The second drive input 24 is connectable with the input drive shaft 16 by way of a fifth clutch C5. A sixth clutch C6 is connected in parallel with the fourth clutch C4 and fourth one-way coupling F4 between the third reaction input 32 and the housing 12. A seventh clutch C7 is connected in parallel with the first one-way coupling F1 between the first drive input 22 and the first clutch C1. The first reaction input 28 is also connectable with the housing 12 by way of an eighth clutch C8. The third drive input 26 is connectable with the input drive shaft 16 by way of a ninth clutch C9.

Referring to FIG. 3, the automatic transmission 10 is capable of providing a first forward gear ratio, a second forward gear ratio which is less than the first ratio, a third forward gear ratio which is less than the second ratio, a fourth forward gear ratio which is less than the third ratio, a fifth forward gear ratio which is less than the fourth forward gear ratio, and a reverse gear ratio. Preferably, the fourth ratio is direct drive, and the fifth ratio is an overdrive.

For first forward gear ratio operation, first, second and seventh clutches C1, C2 and C7 are engaged (applied) and first and second one-way couplings F1 and F2 are also engaged (under load). The other clutches remain disengaged and the other one-way couplings act as an over-running free wheel. For second forward gear ratio operation, first, second, third and seventh clutches C1, C2, C3 and C7 are engaged and first and third one-way couplings F1 and F3 are also engaged. For third forward gear ratio operation, first, second, third, fourth and seventh clutches C1, C2, C3, C4 and C7 are engaged and first and fourth one-way couplings F1 and F4 are also engaged. For fourth forward gear ratio operation, first, second, third, fourth, fifth and seventh clutches C1, C2, C3, C4, C5 and C7 are engaged and first one-way coupling F1 is engaged. For fifth forward gear ratio operation, first, second, third, fourth, fifth and sixth clutches C1, C2, C3, C4, C5 and C6 are engaged. For reverse gear ratio, eighth and ninth clutches C8 and C9 are engaged.

The shift from fourth forward gear ratio to fifth forward gear ratio is achieved by engaging (applying) sixth clutch C6 and disengaging (releasing) seventh clutch C7. However, seventh clutch C7 can be released/applied approximately one second before/after sixth clutch C6 is applied and so there is no need for complex time control of the operation of these clutches C6, C7.

It will be appreciated, therefore, that a shift from first forward gear ratio to second forward gear ratio is achieved by engaging (applying) third clutch C3. Similarly, a shift from second forward gear ratio to third forward gear ratio is achieved by engaging (applying) fourth clutch C4, a shift from third forward gear ratio to fourth forward gear ratio is achieved by engaging (applying) fifth clutch C5, and a shift from fourth forward gear ratio to fifth forward gear ratio is achieved by engaging (applying) sixth clutch C6. All of these shifts can be achieved without the need for complex time control of the operation of the clutches. Similarly, it will be appreciated that a shift from one forward gear ratio to the next adjacent gear ratio is achieved by engaging or disengaging a single one-way coupling.

The ratios of the five forward gears may be calculated as shown in FIG. 3. In these calculations, the number of teeth on the long pinion gear 54 is taken to be the same for each planetary gear set 40,42. Also, in these calculations, d1 is the number of internal teeth on the ring gear 48 of the first planetary gear set 40, a1 is the number of external teeth on the sun gear 44 of the first planetary gear set 40, d2 is the number of internal teeth on the ring gear 50 of the second planetary gear set 42, and a2 is the number of external teeth on the sun gear 46 of the second planetary gear set 42. It will be appreciated that where the number of teeth at each end of the long pinion gear 54 is different, than alternative calculations will be required.

In the present invention, shifts from one ratio to another can be achieved solely by operating only one clutch, removing the need for timing control of engaging/disengaging clutches, thereby providing quieter and more reliable gear shifts.

The present invention may be used with other layouts for the planetary gear train. The automatic transmission of the present invention is primarily intended for use in a motor vehicle. The present invention has particular application in a motor vehicle having front wheel drive.

What is claimed is:

1. An automatic transmission comprising a housing; a planetary gear train mounted within the housing; an input drive shaft for providing input drive to the planetary gear train; an output drive shaft connected with an output drive from the planetary gear train; a first clutch connected between the input drive shaft and a first drive input to the planetary gear train; a second clutch connected between a first reaction input to the planetary gear train and the housing; a third clutch connected between a second reaction input to the planetary gear train and the housing; a fourth clutch connected between a third reaction input to the planetary gear train and the housing; and a fifth clutch connected between a second drive input to the planetary gear train and the input drive shaft; wherein for first forward gear ratio the first and second clutches are engaged; for second forward gear ratio the first, second and third clutches are engaged; for third forward gear ratio the first, second, third and fourth clutches are engaged; and for fourth forward gear ratio the first, second, third, fourth and fifth clutches are engaged.

2. An automatic transmission as claimed in claim 1, further comprising a sixth clutch connected between the third reaction input and the housing, wherein for fifth forward gear ratio the first, second, third, fourth, fifth and sixth clutches are engaged.

3. An automatic transmission as claimed in claim 1 or claim 2, wherein the planetary gear train comprises first and second planetary gear sets; the first planetary gear set comprising a sum gear, a ring gear, first and second pinion gears, and a planet carrier on which the first and second pinion gears are rotatably mounted, the first pinion gear engaging the sun gear and the ring gear and the second pinion gear engaging the first pinion gear; the second planetary gear set comprising a sun gear, a ring gear, and a pinion gear engaging the sun gear and the ring gear; wherein the second pinion gear of the first planetary gear set is connected with said pinion gear of the second planetary gear set to form a long pinion gear; and wherein the first drive input is connected to the sun gear of the second planetary gear set; the second drive input is connected to the planet carrier; the first reaction input is connected to the planet carrier; the second reaction input is connected to the ring gear of the second planetary gear set; and the third reaction input is connected to the sun gear of the first planetary gear set.

4. An automatic transmission as claimed in claim 3, wherein the ring gear of the first planetary gear set is connected to the output drive shaft.

5. An automatic transmission as claimed in claim 3 or claim 4, wherein the number of teeth on the long pinion gear for the first planetary gear set and for the second planetary gear set is the same.

* * * * *